Dec. 30, 1952  L. W. PETERSEN  2,623,850
WATER TREATMENT
Filed June 6, 1949   3 Sheets-Sheet 1

INVENTOR.
Lowell W. Petersen
BY
R. G. Story
ATTORNEY

Dec. 30, 1952 L. W. PETERSEN 2,623,850
WATER TREATMENT
Filed June 6, 1949 3 Sheets-Sheet 2

INVENTOR.
Lowell W. Petersen
BY
R.G. Story
ATTORNEY

Dec. 30, 1952     L. W. PETERSEN     2,623,850
WATER TREATMENT

Filed June 6, 1949     3 Sheets-Sheet 3

FIG. 1-A

INVENTOR.
Lowell W. Petersen
BY
R.D. Story
ATTORNEY

Patented Dec. 30, 1952

2,623,850

UNITED STATES PATENT OFFICE 2,623,850

WATER TREATMENT

Lowell W. Petersen, Chicago, Ill., assignor to Swift & Company, Chicago, Ill., a corporation of Illinois Application June 6, 1949, Serial No. 97,463

8 Claims. (Cl. 210—16)

This invention relates to the treatment of water for the purpose of removing undesirable suspended or dissolved substances therefrom, and more particularly it relates to an improved method and apparatus for the separation of a mixture of water and solids chemically precipitated therefrom.

It is well known in the art that the addition of certain chemicals, such as lime and soda ash, to water having undesirable solids dissolved therein has the effect of causing the dissolved solids to precipitate and form a suspension or slurry with the water. It is further known that to add raw water and chemicals to a slurry formed as above results in improved and accelerated coagulation and purification of the water. The solids which precipitate from the raw water tend to deposit by accretion on the particles present in the slurry, forming relatively stable particles which are readily separable from the clear, purified water.

It is an object of this invention to provide an improved method and apparatus for the purification of water utilizing the principles outlined above.

It is another object of this invention to provide an improved method and apparatus for the purification of water wherein the raw water is mixed with partially clarified, partially treated water prior to the addition of chemicals thereto.

Additional objects, if not specifically set forth herein, will be apparent to one skilled in the art from the following detailed description of the apparatus and method of this invention.

Referring to the drawings, Figure 1 represents a vertical section through the improved water treating apparatus.

Figure 1-A is a schematic drawing illustrating one type of raw water inlet-control means.

Figure 1:
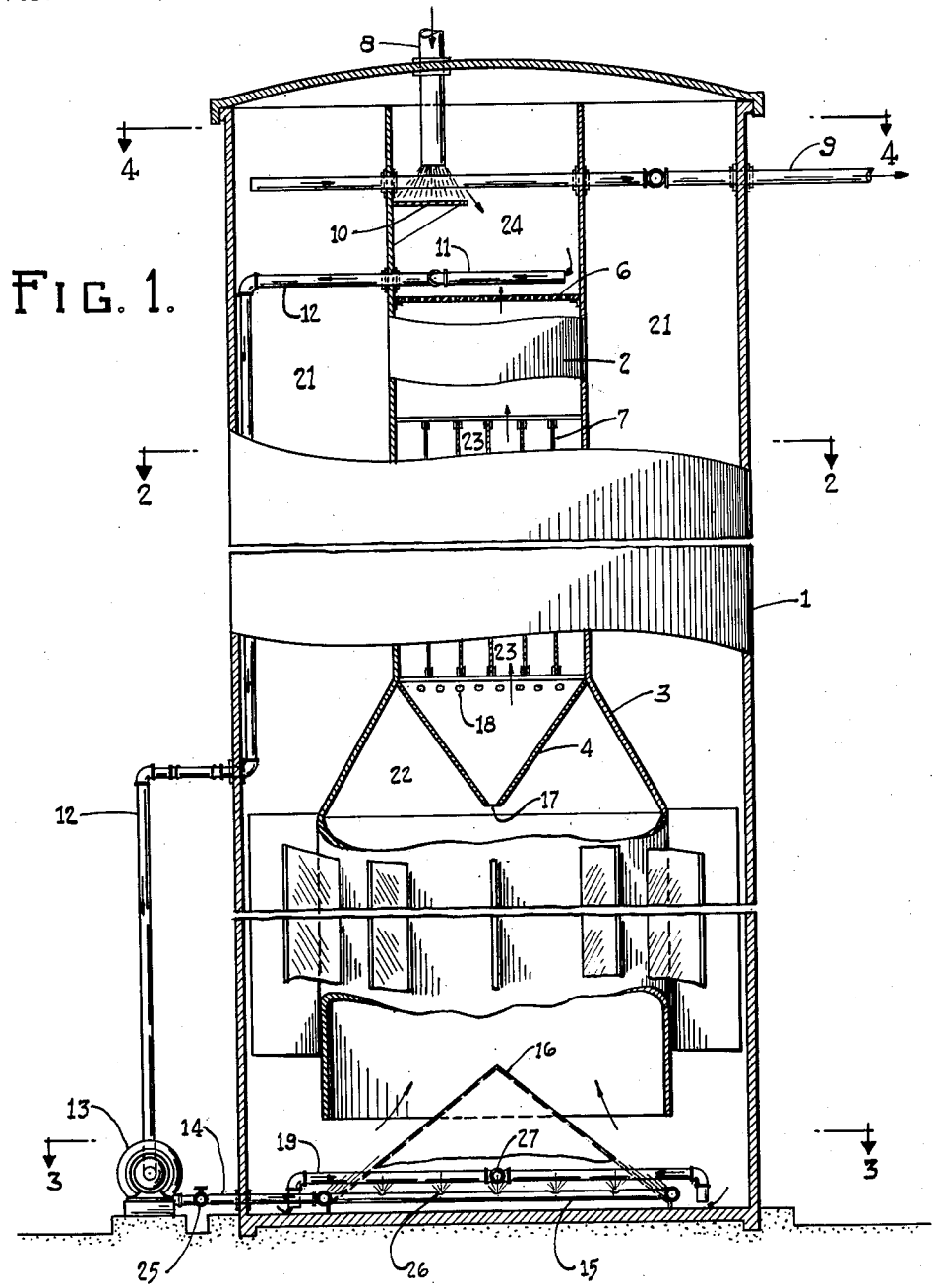
Figure 4:
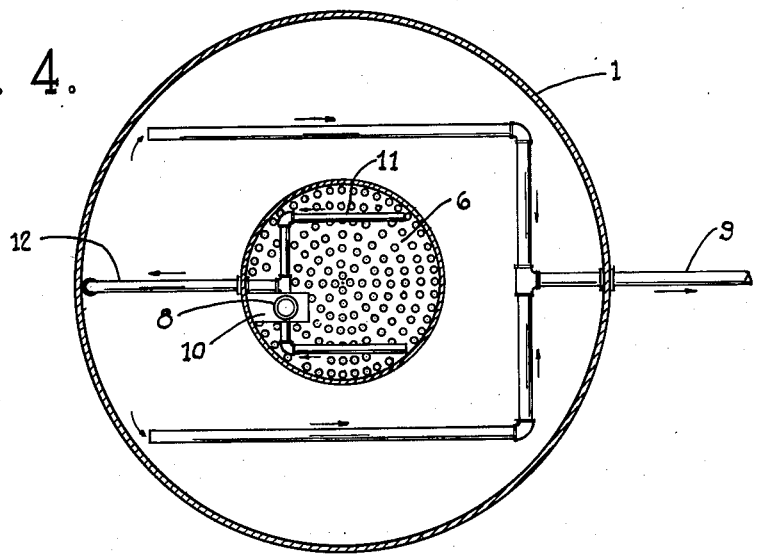
Figure 4 is a cross-sectional view through the apparatus taken on the line 4—4 of Figure 1.
Figure 2:
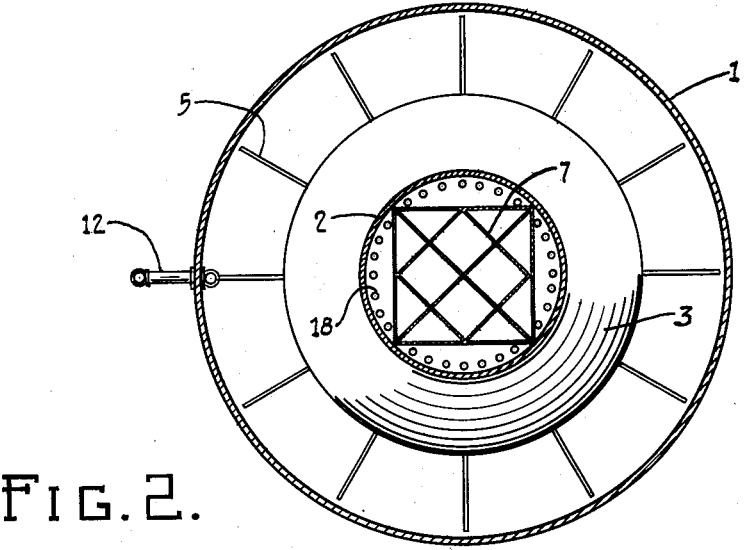
Figure 2 is a cross-sectional view through the apparatus taken on the line 2—2 of Figure 1.

More particularly, the preferred form of the improved water treating apparatus as shown in Figures 1 and 2 of the drawings comprises an outer, preferably cylindrical, vertical tank 1 and an inner, concentrically mounted shell 2 having an enlarged portion or chamber 3 at the lower end thereof. The said inner shell 2 is divided into two compartments by a horizontal, perforated plate 6 mounted in the upper portion thereof. The lower compartment of shell 2 has a plurality of vertical baffles 7, the arrangement of which is shown in Figures 1 and 2. The baffles extend from a point substantially near the top of the compartment to the point where the inner shell is enlarged to form the aforementioned chamber 3. Extending downwardly within the chamber 3 is a hollow cone-shaped member 4 forming an extension of the upper relatively small diameter portion of shell 2, said cone-shaped member having at the lower apex thereof a port or opening 17 providing a passageway between the interior of the chamber 3 and the interior of the cone-shaped member 4. Arranged in spaced relationship around the upper base portion of the cone-shaped member 4 and extending therethrough are a plurality of orifices or openings 18 connecting the interior of chamber 3 with the interior of baffle-containing, lower compartment of shell 2. Chamber 3, which as mentioned above may be considered as an enlarged portion of inner shell 2, extends downwardly to a point substantially near the base of the tank 1, leaving, however, a well-defined passageway between the open base of chamber 3 and the interior of the said tank 1. Mounted on the outer surface of chamber 3 and extending almost to the interior surface of tank 1 is a plurality of spaced, vertical stilling baffles 5.

The remaining portions of the preferred form of the improved water treating apparatus will be best disclosed in their proper relationship and function by the following description of the apparatus under operating conditions.

Raw water, having undesirable dissolved or suspended solids therein, enters the apparatus through inlet 8, passing into the aforementioned upper compartment of inner shell 2. Suitable control means are provided to keep the level of liquid within the apparatus between predetermined desired limits. Such control means, which do not form a part of this invention and accordingly are illustrated only schematically in the drawings (see Figure 1-A), may comprise an electric float switch 30 mounted within tank 1 and adapted to admit raw water to the apparatus when the liquid drops below a predetermined level and to automatically cut off such incoming raw water when the liquid level reaches a predetermined high.

The raw water entering the apparatus through inlet 8 contacts a horizontal baffle 10 mounted within the upper compartment or mixing zone 24 of inner shell 2 whereby the said raw water is dispersed throughout the compartment 24. The raw water in compartment 24 is contacted and mixed with an uprising column of partially clarified and treated water which has previously passed through the apparatus. The means and method of forming this uprising column of partially clarified and treated water will be disclosed at a later stage of this description.

Figure 3:
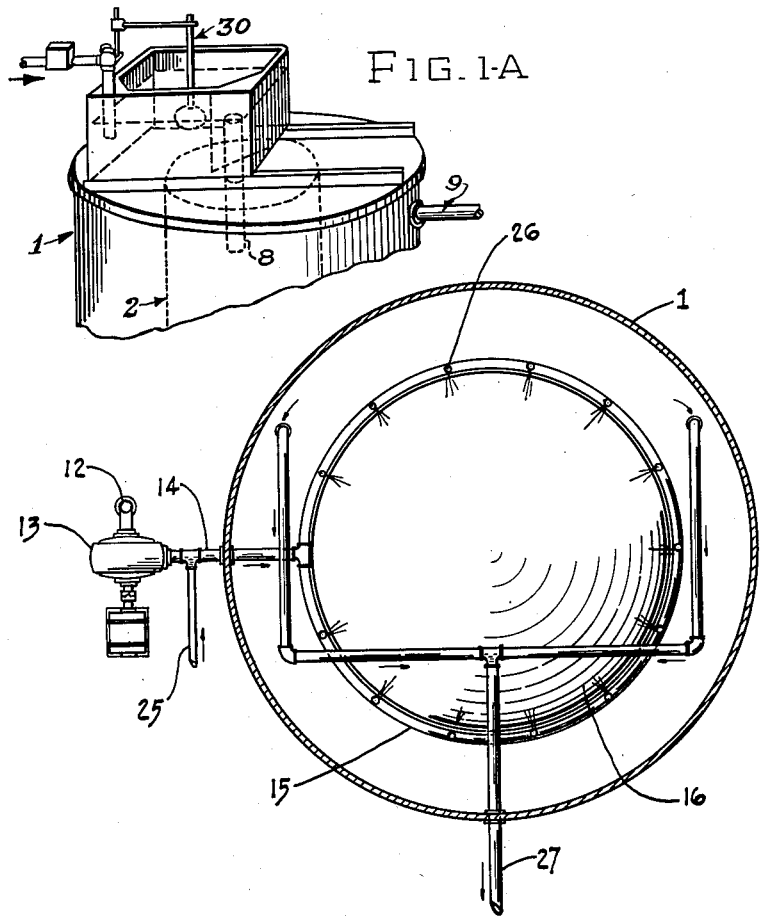
Figure 3 is a cross-sectional view through the apparatus taken on the line 3—3 of Figure 1.

The mixture of raw water and partially clarified, treated water is picked up by the agitating pump 13 through lines 11 and 12, and in passing through the said pump, the velocity and pressure of the mixture are increased to a considerable extent. Upon leaving the pump 13 through line 14, the mixture of raw water and partially clarified, treated water is treated with chemical precipitating reagents introduced through line 25 and thereafter the mixture re-enters tank 1 and passes into the liquid distributing ring 15. The said ring 15, as shown in Figures 1 and 3, is horizontally mounted at the bottom of tank 1 directly below the open, lower end of chamber 3. The mixture of raw water; partially clarified, treated water; and chemicals exits from ring 15 through a plurality of orifices or ports 26, said ports being located in spaced relationship around the circumference of ring 15 and so placed that the mixture of water and chemicals issuing therefrom is directed against a liquid deflecting cone 16 mounted within ring 15 and having its apex within the interior of chamber 3 and thence upwardly into chamber 3. By virtue of the increased velocity and pressure imparted to the mixture by agitating pump 13, the said mixture upon being deflected upwardly into chamber 3 causes a high degree of agitation and turbulence in the space within the said chamber 3, designated in Figure 1 by numeral 22 and hereinafter referred to as the reaction zone. Within this reaction zone 22, thorough mixing of the chemicals with the water takes place, and the undesirable substances dissolved in such water begin to precipitate out. The direction of flow within this chamber is approximated by the arrows on Figure 1.

A portion of the mixture from zone 22 passes upwardly through orifices 18 into the lower compartment of inner shell 2, hereinafter referred to as the primary clarification zone and designated in Figure 1 by the numeral 23. The amount of water entering the primary clarification zone 23 through the orifices 18 depends upon the size of pump 13 and the volume of raw water entering the apparatus through inlet 8. The water entering the said primary clarification zone 23 passes upwardly through stilling baffles 7 mounted within such zone, permitting the suspended solids to agglomerate into particles large enough to settle downwardly through the uprising column of water and collect in the conical member 4 from whence they again pass downwardly through opening 17 into the reaction zone 22. The uprising water in shell 2, being thus partially clarified and carrying with it only a relatively small amount of suspended solids, passes through the perforated plate 6, which serves to distribute flow across area 23 uniformly, and contacts the incoming raw water from inlet 8 within compartment 24 as described in the first portion of this discussion.

The amount of water passing from the primary clarification zone to supplement the raw water volume in providing a sufficient quantity of liquid for agitation in the reaction zone, as heretofore pointed out, depends upon the size of the pump used and the volume of raw water input. However, it has been found that the lower practical limit is at a rate equivalent to two gallons per square foot per minute based upon the cross-sectional area of shell 2. The rate at which water, satisfactory for the purpose intended, might flow upward in the primary clarification zone is limited at the higher rates of flow by the necessity of obtaining a partially clarified liquid. Too high a rate of flow would prevent partial clarification from taking place, and the sludge particles in the resulting mixture would be broken down upon being passed through the centrifugal pump. The maximum practical rate of flow upwardly through the primary clarification zone has been found to be approximately 14 gallons per square foot per minute based upon the cross-sectional area of inner shell 2.

The remaining water within the reaction zone 22 is displaced by further water and chemicals being deflected upwardly within the said zone from ring 15 and passes in the direction indicated by the arrows in Figure 1 down the sides of chamber 3 and out into the annular space between chamber 3 and the inner wall of tank 1. This water, bearing a relatively high concentration of suspended solids, rises within the said annular space, its agitation being stilled by vertical baffles 5 whereby the said suspended solids agglomerate into particles which are large enough to pass downwardly towards the bottom of the tank. Some of these particles will be of such size that they will drop to the bottom of the tank where they are picked up by the solids pickup system 19 and removed from the apparatus. The remaining smaller particles which settle down from the baffles 5 are pulled into the reaction zone by the mixture issuing from the liquid distributing ring 15 and are subsequently built up by accretion to a size where they in turn will settle to the bottom of the tank to be picked up by the solids pickup system 19 and discharged through the line 27 as shown in Figures 1 and 3.

The water rising within the annular secondary clarification zone, defined by the inner walls of tank 1 and the outer walls of shell 2 and designated in Figure 1 by the numeral 21, has been thus clarified to the desired extent; and the treated, clarified water is thereupon withdrawn from the apparatus through system 9 mounted at the top of the said zone 21.

The foregoing description has set forth in detail the preferred form of the apparatus embodying the present invention as well as the preferred method of operation of this invention. It is to be understood, however, that the invention is not intended to be limited thereto but may be modified within the scope of the appended claims.

I claim:

1. A method for treating water to remove substances therefrom by chemical precipitation which comprises contacting the water to be treated with partially clarified water and forming a mixture thereof, adding chemicals to the mixture so formed and passing the said mixture into a reaction zone under sufficient pressure to cause agitation therein, displacing a sufficient portion of the water from the said reaction zone into a primary clarification zone to give a flow rate of from about 2 to about 14 gallons per minute per square foot of cross-sectional area in said primary clarification zone and contacting the incoming raw water therewith, displacing the remaining water from the said reaction zone into a secondary clarification zone wherein the precipitated solids settle out, and withdrawing treated, clarified water from the said secondary clarification zone.

2. In a water treating apparatus a treating tank, an inner shell extending downwardly within the said tank to a point near the base thereof and communicating at its bottom with the interior of said tank, said inner shell and said tank forming an annular passage therebetween, said inner shell having an open-bottomed base portion of greater cross-sectional area than the upper portion thereof, communicating means between the said base portion and the said upper portion, a raw water inlet in the upper portion of the said inner shell, means so arranged as to withdraw water from the upper portion of the said inner shell and to introduce such water into the base of the said tank at a point immediately below the open bottom of the base portion of the said inner shell, means for introducing chemicals into such water after withdrawal from said inner shell and prior to introduction into said tank, agitation stilling means mounted in the annular space between the base portion of the said inner shell and the said tank, means for removing solids precipitated from the treated water, and means for removing clarified, treated water from the upper portion of the annular space between the said inner shell and the said tank.

3. Apparatus for the treatment of water comprising in combination an outer tank having an inner shell concentrically mounted therein and communicating at its lower end therewith, said inner shell having a small diameter upper portion and a larger diameter lower portion, means separating the said upper portion from the said lower portion and having passages therein connecting the interiors of the said upper and lower portions, vertical baffles mounted within the said upper portion, inlet means for introducing raw water into the said upper portion, in which portion the said raw water is contacted and mixed with an uprising column of partially clarified, previously treated water, means to withdraw such mixture of raw water and partially clairified water from the said upper portion of the said inner shell and to force such mixture upwardly within the larger diameter lower portion of the said inner shell, means for introducing chemicals into such mixture prior to forcing said mixture upwardly within said larger diameter lower portion of said inner shell, vertical baffles mounted within the annular space between the said inner shell and the said outer tank to still the agitation of the treated water rising therethrough, means for withdrawing precipitated solids from the bottom of the said tank, and means for withdrawing treated, clarified water from the upper portion of the annular space between the said inner shell and the said tank.

4. In a water treating apparatus a treating tank, an inner shell extending downwardly within the said tank and communicated at its bottom therewith and forming an annular passage therebetween, said inner shell having an open-bottomed base portion of greater cross-sectional area than the upper portion thereof, means separating the said base portion from the said upper portion and having ports therein to permit water to pass therebetween, the upper portion of the said inner shell having vertical baffles mounted therein, a raw water inlet in the upper portion of the said inner shell, a liquid distributing ring mounted in the base of said tank at a point immediately below the open bottom of the base portion of said inner shell, means so arranged as to withdraw water from the upper portion of the said inner shell and to introduce such water into said liquid distributing ring, means for introducing chemicals into such water prior to the introduction of the water into said liquid distributing ring, a cone-shaped member mounted within the said liquid distributing ring and extending upwardly therefrom, orifices in the said liquid distributing ring so arranged that liquid issuing therefrom impinges against the said cone-shaped member and is deflected upwardly into the interior of the base portion of the said inner shell, vertical baffles mounted in the annular space between the base portion of the said inner shell and the said tank, means for removing solids precipitated from the treated water, and means for removing clarified, treated water from the upper portion of the annular space between the said inner shell and the said tank.

5. Water treating apparatus comprising in combination an outer tank, an inner shell extending downwardly therein, said inner shell having an open-bottomed base portion of larger diameter than the upper portion thereof, said base portion being in communication with the said tank near the bottom thereof, a conical member of the same cross-sectional area as the upper portion separating said base portion from said upper portion and extending downwardly within the said base portion, ports providing communication between the said base portion and the said upper portion, the said upper portion having vertical baffles mounted therein, a raw water inlet in the said upper portion, means connecting the said upper portion with the base of the said tank at a point directly below the open bottom of the larger diameter base portion of the said inner shell, vertical baffles mounted in the annular space between the base portion of the said inner shell and the said tank, means for introducing chemicals into said first-mentioned means, means for removing solids precipitated from the treated water and means for removing clarified, treated water from the upper portion of the annular space between the said inner shell and the said tank.

6. Water treatment apparatus comprising in combination an outer tank, an inner shell extending downwardly therein, said inner shell having an open-bottomed base portion of larger diameter than the upper portion thereof, said base portion being in communication with the said tank near the bottom thereof, a conical member of the same cross-sectional area as the said upper portion separating said base portion from said upper portion and extending downwardly within the said base portion, ports providing communication between the said base portion and the said upper portion, a horiozntal perforated plate dividing the said upper portion into two compartments, vertical baffles mounted within the lower compartment of the said upper portion, a raw water inlet in the upper compartment of the said upper portion, means connecting the upper compartment of the said upper portion with the base of the said tank at a point directly below the open bottom of the larger diameter base portion of the said inner shell, vertical baffles mounted in the annular space between the base portion of the said inner shell and the said tank, means connected to said first-mentioned means whereby chemicals may be introduced into the water, means for removing solids precipitated from the treated water, and means for removing clarified, treated water from the upper portion of the annular space between the said inner shell and the said tank.

7. Water treatment apparatus comprising in combination a vertical cylindrical tank, an inner shell extending downwardly therein, said inner shell having an open-bottomed base portion of larger diameter than the upper portion, said base portion being in communication with the tank near the bottom thereof, a conical member of the same cross-sectional area as the said upper portion separating said base portion from said upper portion and extending downwardly within the said base portion, ports providing communication between the said base portion and the said upper portion, a horizontal perforated plate dividing the said upper portion into two compartments, vertical baffles mounted within the lower compartment of the said upper portion, a raw water inlet in the upper compartment of the said upper portion, a liquid distributing ring mounted in the base of the said tank at a point immediately below the open bottom of said base portion of said inner shell, means including a centrifugal pump connecting the upper compartment of the said upper portion with said liquid distributing ring, means for introducing chemicals into said first-mentioned means at a point between said pump and said liquid distributing ring, a cone-shaped member mounted within the said liquid distributing ring and extending upwardly therefrom, orifices in the said liquid distributing ring so arranged that liquid issuing therefrom impinges against the said cone-shaped member and is deflected upwardly into the interior of the base portion of the said inner shell, vertical baffles mounted in the annular space between the base portion of the said inner shell and the said tank, means for removing solids precipitated from the treated water, and means for removing clarified, treated water from the upper portion of the annular space between the said inner shell and the said tank.

8. In a method for treating water to remove substances therefrom by chemical precipitation the steps comprising: forming two continuous columns of uprising, previously treated water, the water in the first of said columns rising at such a rate as to be only partially clarified, said rate being from about 2 to about 14 gallons per minute per square foot of cross-sectional area of said column, and the water in the second of said columns rising at a sufficiently slower rate as to be substantially completely clarified; continuously withdrawing water from the first of said columns and admixing it with incoming raw water and chemicals; passing said mixture under pressure into a reaction zone to provide agitation therein whereby previously treated water within such reaction zone is displaced to form the aforesaid two uprising columns of water; and continuously withdrawing clarified water from the top of said second column of water.

LOWELL W. PETERSEN.

REFERENCES CITED

The following references are of record in the file of this patent:

UNITED STATES PATENTS

| Number | Name | Date |
|---|---|---|
| 2,245,587 | Hughes | June 17, 1941 |
| 2,353,358 | Prager | July 11, 1944 |
| 2,365,293 | Robinson | Dec. 19, 1944 |
| 2,378,799 | Sebald | June 19, 1945 |
| 2,379,753 | Sebald | July 3, 1945 |
| 2,400,598 | Prager | May 21, 1946 |
| 2,429,315 | Green | Oct. 21, 1947 |
| 2,442,809 | Hallier et al. | June 8, 1948 |
| 2,464,617 | Sebald | Mar. 15, 1949 |